Figure 1:
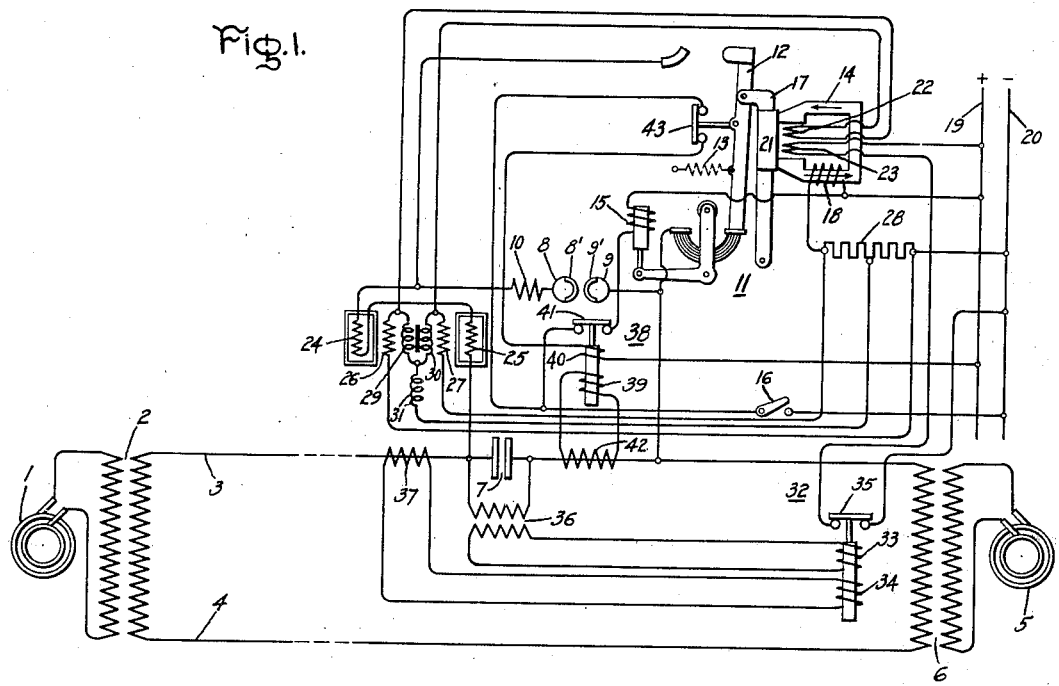

April 15, 1930.  T. A. E. BELT  1,755,095

SYSTEM OF PROTECTION AND CONTROL FOR ELECTRICAL APPARATUS

Original Filed March 9, 1927

Inventor:
Thomas A. E. Belt,
by
His Attorney.

Patented Apr. 15, 1930

1,755,095

UNITED STATES PATENT OFFICE

THOMAS A. E. BELT, OF SCHENECTADY, NEW YORK, ASSIGNOR TO GENERAL ELECTRIC COMPANY, A CORPORATION OF NEW YORK

SYSTEM OF PROTECTION AND CONTROL FOR ELECTRICAL APPARATUS

Application filed March 9, 1927, Serial No. 174,051. Renewed March 3, 1930.

My invention relates to systems of protection and control for electrical apparatus utilized in connection with systems of electrical distribution, and has for its object to provide a new and improved system of protection and control for capacitance units, such as static condensers, operated in connection with systems of distribution, whereby the capacitance units may be protected from injury due to over-voltage or other abnormal conditions and whereby the relation or connection of the capacitance units to the circuit may be controlled in accordance with the characteristics of the circuit or condition of the capacitance unit.

When capacitance units such as static condensers, or capacitors which have a dielectric subject to permanent breakdown, are connected to an electric circuit either in series or in parallel, it is desirable both from the standpoint of economy and reliability of service to protect the capacitors from breakdown or permanent injury. When capacitors are connected in series relation with electric circuits, they are more susceptible to breakdown due to overvoltage than when shunt connected, because the variation in voltage across the capacitor is proportional to the current in the circuit in which they are interposed and the capacitors are thereby rendered susceptible to voltage rises in case of an overload or short-circuit.

Power transmission circuits having a series distributed capacitance introduced in each phase conductor of the circuit for improving the voltage regulation and for increasing the power limit of the transmission system is described and claimed in an application of Clifford A. Nickle, Serial No. 24,243, filed April 18, 1925 for electrical power transmission, which is assigned to the same assignee as the present application.

My invention finds particular application in systems of distribution such as is disclosed and claimed in an application of H. R. Summerhayes, Serial No. 165,236, filed February 1, 1927, and assigned to the same assignee as this application, in which capacitors are connected in series relation with a transmission line for increasing the power limits and improving the voltage regulation of a transmission system, and will be described in connection with such a system. It will be apparent, however, that the invention is not limited to series connected capacitors or a particular system of distribution.

In accordance with one embodiment of my invention, the capacitors to be protected are provided with a discharge gap comprising spaced gap electrodes set for a predetermined voltage, and a switch, preferably a quick acting switch, arranged to establish a low resistance circuit such as a short-circuit around the gap and capacitor upon the development of a fault therein or immediately following a discharge across the gap. The switch is also arranged to open the low resistance circuit or short-circuit around the capacitor and gap upon the return of normal conditions in the circuit. According to another embodiment of my invention, a capacitor is connected in series relation with the circuit through a series transformer which is arranged to become highly saturated under overload or short-circuit conditions, and thus limit the voltage to which the capacitor is subjected; a protective equipment being provided to eliminate distortion in the line current following the overload or short-circuit.

My invention will be better understood from the following description taken in connection with the accompanying drawing, and its scope will be pointed out in the appended claims.

Figure 2:
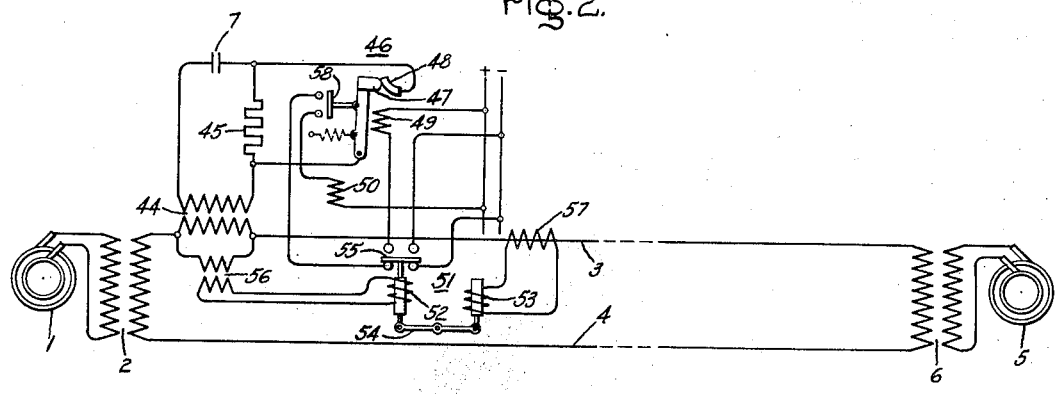

In the drawing, Fig. 1 illustrates diagrammatically one embodiment of my invention in its preferred form, and Fig. 2 illustrates diagrammatically a modified form of the invention.

Referring to Fig. 1, a supply station diagrammatically represented as comprising a synchronous generator 1 is connected to supply electrical energy to a step-up power transformer 2 which is connected to energize a single-phase transmission line comprising conductors 3 and 4. A receiving station, diagrammatically represented as comprising a synchronous motor 5, is connected to receive electrical energy from the transmission line 3—4 through step-down transformers 6. For simplicity of illustration and description, single phase supply apparatus, transmission line, and receiving apparatus have been shown, but it is to be understood that my invention is equally well adapted for use in polyphase systems, and it is immaterial whether power flow is at times in one direction and at other times in the opposite direction.

Capacitance units such as static condensers or capacitors varying in position in the line and number according to the requirements of the circuit or system are inserted in series with the line and indicated by a single capacitor 7. The capacity of these capacitors is so proportioned as to partly, wholly, or overcompensate for the inductive reactance of the transmission line or system.

The capacitor 7 is provided with a spark gap comprising electrodes or spheres 8 and 9 connected across the terminals of the capacitor, and arranged to break down at a critical voltage; that is, spaced at such a distance as to limit the voltage or maximum instantaneous value of the voltage across the capacitor to a safe value for the particular dielectric used. The gap breaks down when the voltage rises to the sparkover value, and further increase is thereby presented. A particular structure for the sphere gaps which has been found satisfactory in practice comprises brass spheres provided with a facing or cap 8' and 9' of tungsten which may be secured to the spheres in any suitable manner, as by bolting. The tungsten face is utilized to reduce burning and pitting upon discharge, and as a consequence the voltage calibration of the gap remains more nearly constant. The operation of the gap is further improved by the use of a powerful magnetic blowout which comprises a coil 10 connected to be energized in accordance with the gap current. The magnetic blowout tends to drive the arc away from the gap and eliminates the formation of points or projections on the gap electrodes by removing the metal vapor or molten metal from the gap.

The gap is further protected by a switch 11 which is utilized to short-circuit the arc as quickly as possible after the breakdown of the gap. Switch 11 is also used to short-circuit the capacitor in case the dielectric of the capacitor fails.

The switch 11 is preferably of the well-known quick-acting type which is disclosed and claimed in Reissue Patent No. 15,441, granted August 29, 1922, and comprises the circuit-controlling member 12 which is strongly biased in this arrangement to the circuit-closing position by the spring 13 and which is arranged to be held in the circuit-opening position by the holding electromagnet 14 when moved thereto by the electrically operated opening mechanism 15. A suitable switch diagrammatically represented by a hand switch 16 is inserted in the circuit of the coil 15 to permit initial setting of the switch.

The circuit-controlling member 12 is pivotally mounted upon a rotatable arm 17 and is arranged to trip free, in this case close the switch contacts, when an excessive arc current flows through the gap circuit. This particular feature of tripping which performs the closing function in this arrangement is fully disclosed and claimed in Letters Patent No. 1,560,440, granted November 3, 1926.

The winding 18 of the holding electromagnet 14 is normally energized from a suitable unidirectional source of current indicated by direct current supply lines 19 and 20. When normally energized, winding 18 supplies a unidirectional flux of sufficient value to hold magnetic member 21 carried by the rotatable arm 17 in engagement with the poles of the main electromagnet 14 against the opposing pull of the biasing spring 13, and thus maintains the circuit-controlling member 12 in the circuit-opening position.

As set forth in the above-mentioned Tritle reissue patent, and as more fully described in Letters Patent No. 1,506,483, granted August 26, 1924, a winding or current conductor 22 is associated with the holding electromagnet 14 for diverting the holding flux from the magnetic member 21 to permit the switch to operate, in this arrangement to close, in accordance with its bias. A similar winding 23 energized and effective under different conditions hereinafter set forth is also provided to effect closing of the switch. With the winding 18 energized to set up a unidirectional holding flux in the electromagnet 14 in the direction indicated by the arrows in the drawing the switch is closed only when the windings 22 or 23 are energized with current in a predetermined direction so as to supply magnetization of the proper polarity to release magnetic member 21.

The arrangement for obtaining a unidirectional current in the circuit of coil 22 when alternating current flows in the spark gap circuit is similar to the arrangement disclosed and claimed in an application of Jacob W. McNairy, Serial No. 89,247, filed February 18, 1926. As shown, primary windings 24 and 25 are connected in series with the circuit around the capacitor 7 so as to be responsive to the gap current upon breakdown of the gap. Secondary windings 26 and 27 are supplied directly with magnetizing current by the voltage drop across a resistor 28 which is connected to be energized in a series circuit with the holding coil 18 of the switch 11 from the direct current supply source. The polarity of the direct magnetization of the transformers 24 and 25 is such that the currents induced in the secondary windings 26 and 27 upon the flow of current in either direction in the primary windings tends to increase the magnetization of one of the transformers and decrease the magnetization of the other transformer. The secondary windings 26 and 27 are connected to a reactor comprising windings 29 and 30, and the midpoint between the reactor windings is connected to the midpoint of the resistor 28 preferably through a loading coil 31. The secondary windings 26 and 27 are connected differentially or in opposition so that upon energization by current in steady state the current induced in the secondary winding 26 flows through the reactor 29 and the mid-connection to the resistor 28, while the current induced in the winding 27 flows through the reactor winding 30 and the midpoint of the resistor. Under these conditions the energization of the reactor windings 29 and 30 is such that the magnetizing effects upon the reactor core are neutralized. Consequently, each of the secondary windings 26 and 27 is effectively loaded upon the reactor 31, and there is no appreciable current flowing through the tripping winding 22. When the primary windings of 25 and 26 are not energized, such as when the gap circuit is normal, there is not sufficient energization from the direct current source to energize the coil 22 sufficiently to operate the switch.

When an overload or short-circuit occurs in the main line and the voltage across the capacitor builds up to its breakdown value, a discharge takes place across the gap, and, during the transient conditions following, the current through the primary windings 24 and 25 is rapidly increased. This serves to induce a predominating current in one or the other of the secondary windings 26 and 27, depending upon the point in the alternating current wave at which the breakdown occurs. Under these conditions, the secondary winding in which the predominating current is induced tends to send the predominating current through the corresponding reactor winding. As the predominating current is not neutralized by the current in the other winding, the reactor affords a large reactance. Under these conditions a large voltage is built up across the reactor winding carrying the predominating current. This voltage is impressed upon the winding 22 and is always in the direction required to move switch 11 to the circuit-closing or short-circuiting position.

In case the dielectric of the capacitor fails, the switch 11 is also arranged to move to the circuit-closing or short-circuiting position in order to prevent further damage to the capacitor by passing the load current through the fault. For obtaining this protection, I provide an electroresponsive device 32, preferably a relay of the balanced type, which must not operate to close the switch contacts when the line current is below a predetermined value, but which must operate when the capacitor dielectric fails. This relay comprises two operating coils 33 and 34, and a contact member 35. Coil 33 is connected to be energized in response to the voltage across the capacitor through a potential transformer 36, and coil 34 is connected to be energized in response to the current in the main line through a current transformer 37. Under normal conditions of the capacitor, coils 33 and 34 will be energized in the same proportion, since any increase in main line current will cause a corresponding increase in voltage across the condenser. Should the capacitor dielectric fail, the voltage across the terminals will be approximately zero, so that the relay 32 will operate to move its contact 35 to a circuit-closing position. Contact member 35 in the closed position completes a circuit for tripping coil 23 from the direct current supply bus.

Now, in case of a short-circuit or heavy overload on the transmission line, the switch 11 will perform its desired function of short-circuiting the gap. The usual oil circuit breaker or protective interrupter in the line (not shown) will also open. It is then desirable to put the capacitor back in service when the line is reenergized. This is accomplished by an electroresponsive device or underload relay 38 comprising operating coils 39 and 40 and a contact member 41. The coil 39 is connected to be energized in accordance with the main line current through a current transformer 42, and the coil 40 is connected to be energized a predetermined amount from the direct current supply bus when switch 11 is in the open position.

The operation of the illustrated embodiment shown in Fig. 1 is as follows: It will be assumed that the direct current control bus 19—20 is energized and that switch 11 has been moved to its open or non-short-circuiting position by energizing operating coil 15 by closing switch 16. Coil 18 will be energized to hold the movable member 12 in the position shown. It will also be assumed that power is being transmitted over the transmission line from generating station 1 to the receiving station 5 and that the line is operating under normal conditions. Under these conditions, since the current in the circuit and the voltage across the capacitor 7 energizes the operating coils 33 and 34 of relay 32 in a predetermined proportion to hold contact member 35 out of engagement with its contacts, the tripping coil 23 will not be energized. When switch member 12 is in the position shown, the auxiliary switch 43, associated therewith, closes a circuit through coil 40 of relay 38, and with the additional energization of its coil 39, through current transformer 42, contact member 41 will interrupt the circuit through the operating coil 15. As previously explained, the tripping coil circuit 22 is not sufficiently energized under these conditions to effect operation of switch 11.

Now, assume the transmission system is subjected to overload or short-conduit conditions and the current rise in the line is sufficient to raise the voltage across the capacitor 7 to the spark-over voltage of the sphere gaps 8 and 9. Immediately upon breakdown of the gap, a unidirectional current of the proper direction is introduced in the circuit of tripping coil 22, and due to the shifting of the holding flux of the electromagnet 14, the movable member 12 moves quickly to a circuit-closing or short-circuiting position due to the action of spring 13. The capacitor is thereby protected from breakdown by the sphere gaps, the metal vapor between the gap is prevented from pitting the gap or from forming projections by being diverted from its normal position by the magnetic blowout 10, and the gap is quickly short-circuited to extinguish the arc and prevent burning of the gap electrodes.

When switch 11 moves to its circuit-closing position, auxiliary switch 43 introduces a break in the circuit of coil 40, and upon removal of the system short-circuit or decrease in the line current to a predetermined value, contact 41 of relay 38 moves to a circuit-closing position to complete a circuit for operating coil 15 so that the switch 11 is again moved to its circuit-opening position to put the capacitor back into service again.

In case the dielectric of capacitor 7 breaks down due to failure of the gap to act properly, or the capacitor becomes damaged from some other cause, the normal proportionality between line current and potential across the capacitor will no longer exist so that relay 32 moves its contact member 35 to complete an energizing circuit for tripping coil 23 from the direct current supply bus, and switch 11 moves to circuit-closing or short-circuiting position to place the capacitor out of active service.

Although at the present time it has been found that the direct connection of the capacitor in the line with the combination of spark gap and quick-acting switch as a protective means is the preferred arrangement for installations of the type described, it also has been found practicable to connect the capacitor in series relation with the line through a transformer.

In Fig. 2, I have shown a diagrammatic illustration in which a supply station is diagrammatically represented as comprising a synchronous generator 1 which is connected to feed electrical energy to a step-up power transformer 2, which in turn is connected to energize a single-phase transmission line comprising conductors 3 and 4. A receiving station diagrammatically represented as comprising a synchronous motor 5 is arranged to receive electrical energy from the transmission line conductors 3—4 through step-down transformer 6. These elements of the transmission system are the same as shown in Fig. 1 and hence have been designated by the same numerals.

The capacitor 7 is connected in series relation with the transmission line 3—4 through a potential transformer 44. Protection of the capacitor against destructive overvoltage is obtained by providing a transformer which is designed to saturate during heavy overloads or short-circuits. When the transformer core becomes saturated during overloads or short-circuits, the combination performs very differently from a direct connected capacitor because of resonant conditions under the abnormal conditions in the circuit. Under normal conditions with low flux density in the core, the transformer characteristics do not appreciably affect the circuit, but an excessive rise in voltage due to the abnormal conditions saturates the core and in a sense short-circuits the excess voltage across the capacitor.

Although this phenomenon of saturation of the transformer affords protection against overvoltage, it has been found that this state of saturation persists after removal of the abnormal current condition. This results in distortion of the line current and capacitor voltage, which causes undesirable conditions in the main circuit and may cause synchronous apparatus of the system to fall out of synchronism. This distortion may exist after the removal of a short-circuit, after the occurrence of an overload above a certain current value depending on the circuit constants, and after switching operations which cause momentary high currents.

I have found that this distortion can be substantially eliminated by temporarily changing the electrical characteristics of the capacitor circuit by inserting a resistance in series with the capacitor. Accordingly, a resistance 45 is inserted in series with the capacitor 7 and is normally short-circuited by a switch 46, preferably of the quick-acting type, such as is diagrammatically represented in Fig. 1 by switch 11. This switch is very diagrammatically represented in Fig. 2 by the movable member and contact 47, the stationary contact 48, tripping coil 49, corresponding to the tripping coil 23 of switch 11, and closing coil 50, corresponding to the closing mechanism 15 of switch 11. In this case, however, the switch is arranged to operate in the same manner as the usual circuit interrupter of this type, namely, quick movement to a circuit interrupting position upon energization of its tripping coil.

Switch 46 is arranged to be operated by an electroresponsive device 51 comprising an overvoltage relay and an overload relay. For purposes of illustration, these relays are shown as combined in a relay of the balanced type. This relay comprises operating coils 52 and 53 for actuating a balanced core system 54, carrying contact member 55. The coil 52 is connected to be energized through a potential transformer 56, and is connected to be responsive to the voltage across the capacitor transformer 44. The coil 53 is connected to be energized in accordance with the line current through a transformer 57. The movable member 47 of the switch 46 actuates an auxiliary switch 58 which completes a break in the energizing circuit from the direct current control bus for the closing coil 50 when the switch member 47 is in the circuit interrupting position and introduces a break in the energizing circuit when the member 47 is moved to the circuit-closing position. This closing-coil circuit is completed by contact member 55 of relay 51 when the relay takes its normal balanced position.

The operation of the illustrated embodiment is as follows: Assume the transmission line is energized and operating under normal conditions. The switch 46 will be in the position shown and the relay 51 will have its core system in a balanced condition so as to close a break in the circuit of the switch-closing coil 50 and open the circuit of the tripping coil 49. Now, if an abnormal condition arises, such as an overload, the series transformer will become saturated and protect the condenser from a destructive overvoltage. After the removal of the short-circuit or overload, the voltage across the series transformer becomes abnormally high, if distortion exists, so that coil 52 of relay 51 becomes disproportionately energized as compared to coil 53. Hence, the relay contact 55 is moved to close the circuit of the tripping coil 49 which moves the switch quickly to its circuit-interrupting position and as a consequence introduces the resistance 45 in series with the capacitor. The coil 53 will prevent the relay contacts 55 from closing when the overload or short-circuit exists.

If the resistance 45 is inserted when the distorted condition exists, the following action takes place. During the distorted condition, the transformer is saturated and a large current flows between the transformer and the capacitor. Inserting the resistance reduces this circulating current, reduces the degree of saturation in the transformer, and restores the circuit to its normal state. After the circuit has been restored to its normal state, the resistance is again short-circuited as soon as the balanced relay assumes its normal position to complete the circuit for the closing coil 50, it being noted that the auxiliary switch closed its contacts in the closing coil circuit when switch member 47 moved to the circuit-interrupting position.

While I have shown and described a particular embodiment of my invention, it will be obvious to those skilled in the art that changes and modifications may be made without departing from my invention, and I, therefore, aim in the appended claims to cover all such changes and modifications as fall within the true spirit and scope of my invention.

What I claim as new, and desire to secure by Letters Patent of the United States, is:

1. In combination, an electric circuit, an electric condenser connected in circuit therewith, protective apparatus for preventing breakdown of said condenser including a discharge device having spaced electrodes set for a critical voltage, and a switch connected across said spaced electrodes and operative to short-circuit said spaced electrodes upon a discharge therebetween.

2. In combination, an electric circuit, an electric condenser connected in circuit therewith, means for limiting the potential rise across said condenser, and switching means effective upon an abnormal condition in said circuit for decreasing the current traversing said condenser.

3. In combination, an electric circuit including an electric condenser, a sphere gap including spaced electrodes connected across the terminals of said condenser, and means operative upon breakdown of said gap for short-circuiting said sphere gap.

4. In combination, an electric circuit, an electric condenser connected in circuit therewith, a sphere gap comprising metallic electrodes faced with tungsten connected across the terminals of said condenser, and a switch connected to be responsive to a current through said gap for short-circuiting said gap and condenser.

5. In combination, an electric circuit, an electric condenser connected in series relation therewith, a discharge gap comprising spaced electrodes connected across said condenser, and switching means responsive to a current through said gap for short-circuiting said gap and condenser substantially simultaneously with a discharge between said gap electrodes.

6. In combination, an electric circuit comprising an electric condenser, a discharge gap device comprising two spaced electrodes connected across the terminals of said condenser, and means responsive to an abnormal condition of said condenser for completing a low resistance path around said gap electrodes and condenser.

7. In a system of electric distribution, a transmission line, an electric condenser connected in series relation with said transmission line, a discharge gap comprising spaced electrodes connected across said condenser, means responsive to a discharge across said gap for establishing a low resistance circuit around said gap, and means responsive to a predetermined electrical condition in said transmission line for opening the low resistance circuit around said gap.

8. In a system of electric distribution, a transmission line, an electric condenser having a dielectric subject to permanent breakdown connected in series relation with said transmission line, a discharge gap comprising spaced electrodes connected across said condenser, a switch normally in its circuit-opening position having contacts connected across said condenser, means responsive to a current in said gap circuit for moving said switch to its circuit-closing position, means operative upon the occurrence of a fault in the dielectric of said condenser for moving said switch to its circuit-closing position, and means responsive to the current in said transmission line below a predetermined value for moving said switch to its circuit-opening position.

9. In a system of electric distribution, a source of alternating current, a receiving circuit, a transmission line interconnecting said source and said receiving circuit, a capacitance unit connected in series relation with said transmission line for compensating for the inductive reactance thereof, a discharge device comprising spaced electrodes connected across said capacitance unit, a coil associated with said gap electrodes and connected to be responsive to the current of said gap, a switch having contacts normally in a circuit-opening position connected across said gap, transforming means responsive to a current transient in said gap circuit for effecting movement of said switch to its circuit-closing position, means responsve to an abnormal relation between the current in the circuit of said capacitance unit and the potential across its terminals for moving said switch to its circuit-closing position, and means responsive to a current in said transmission line below a predetermined value for moving said switch to its circuit-opening position.

10. In a system of electric distribution, an alternating current supply circuit, a receiving circuit, a transmission line interconnecting said circuits, a static condenser connected in series with said transmission line for compensating for the inductive reactance thereof, a sphere gap comprising spaced electrodes connected across said condenser, a magnetic blowout comprising a coil associated with said gap electrodes and connected in series relation with the circuit through said gap, a quick-acting switch normally in the circuit-opening position having contacts connected across the terminals of said condenser, a plurality of coils for effecting closing of said switch contacts, transforming means responsive to transient currents in said gap circuit for energizing one of said closing coils, a relay responsive to the potential across said condenser and the current in the transmission line for energizing another of said closing coils upon an abnormal condition of energization of said relay, electroresponsive means for moving said switch to its circuit-opening position, a second relay comprising two operating coils for controlling the energization of said electroresponsive means, one of said coils being connected to have a predetermined energization, and the other of said coils being connected to be energized in accordance with the current in said transmission line, and means associated with said switch for closing the circuit through said first-mentioned coil of said second relay when said switch moves to the circuit-opening position to maintain said second relay in a circuit-interrupting position when said switch moves to its circuit-opening position and the current in said transmission line is below a predetermined value.

In witness whereof, I have hereunto set my hand this 8th day of March, 1927.

THOMAS A. E. BELT.

CERTIFICATE OF CORRECTION.

Patent No. 1,755,095. Granted April 15, 1930, to

THOMAS A. E. BELT.

It is hereby certified that error appears in the printed specification of the above numbered patent requiring correction as follows: Page 2, line 28, for the word "presented" read "prevented"; and that the said Letters Patent should be read with this correction therein that the same may conform to the record of the case in the Patent Office.

Signed and sealed this 13th day of May, A. D. 1930.

(Seal)

M. J. Moore,
Acting Commissioner of Patents.